United States Patent
Depaolo et al.

(10) Patent No.: US 11,240,267 B1
(45) Date of Patent: Feb. 1, 2022

(54) IDENTIFYING AND BLOCKING FRAUDULENT WEBSITES

(71) Applicant: MASSACHUSETTS MUTUAL LIFE INSURANCE COMPANY, Springfield, MA (US)

(72) Inventors: Damon Ryan Depaolo, Barkhamsted, CT (US); Payton A. Shubrick, Springfield, MA (US)

(73) Assignee: MASSACHUSETTS MUTUAL LIFE INSURANCE COMPANY, Springfield, MA (US)

( * ) Notice: Subject to any disclaimer, the term of this patent is extended or adjusted under 35 U.S.C. 154(b) by 217 days.

(21) Appl. No.: 16/721,152

(22) Filed: Dec. 19, 2019

(51) Int. Cl.
*H04L 29/06* (2006.01)
*G06N 20/00* (2019.01)

(52) U.S. Cl.
CPC ......... *H04L 63/1483* (2013.01); *G06N 20/00* (2019.01)

(58) Field of Classification Search
CPC ............................ H04L 63/1483; G06N 20/00
USPC .......................................................... 726/23
See application file for complete search history.

(56) References Cited

U.S. PATENT DOCUMENTS

| | | | | |
|---|---|---|---|---|
| 8,484,225 B1 * | 7/2013 | Datta | ...................... | G06N 5/02 707/749 |
| 2006/0253458 A1 * | 11/2006 | Dixon | ................... | H04L 63/101 |
| 2006/0253584 A1 * | 11/2006 | Dixon | ..................... | H04L 67/02 709/225 |
| 2010/0095375 A1 * | 4/2010 | Krishnamurthy | ..... | G06F 21/554 726/22 |
| 2012/0284105 A1 * | 11/2012 | Li | .......................... | G06Q 30/06 705/14.23 |
| 2014/0330841 A1 * | 11/2014 | Barrett | .................. | G06F 16/951 707/748 |
| 2015/0309813 A1 * | 10/2015 | Patel | .................... | G06F 11/3664 703/22 |
| 2018/0189673 A1 * | 7/2018 | Dalton | ..................... | G06N 3/08 |
| 2020/0092326 A1 * | 3/2020 | Prakash | .............. | H04L 63/1483 |
| 2021/0097178 A1 * | 4/2021 | Bottaro | ................. | G06F 40/216 |

OTHER PUBLICATIONS

Drew et al. "Automatic Identification of Replicated Criminal Websites Using Combined Clustering", IEEE, doi: 10.1109/SPW.2014.26, 2014, pp. 116-123. (Year: 2014).*

Rao et al., "A Computer Vision Technique to Detect Phishing Attacks", IEEE, doi: 10.1109/CSNT.2015.68, 2015, pp. 596-601. (Year: 2015).*

(Continued)

*Primary Examiner* — Peter C Shaw
(74) *Attorney, Agent, or Firm* — Foley & Lardner LLP

(57) ABSTRACT

A system may generate all possible character mistakes in a first uniform resource locator associated with a first website, which may produce a set of unique and similar uniform resource locators associated with a set of similar websites. The system may execute machine vision algorithms to compare visual images of the first website and the set of similar websites, and identify a subset of similar websites, which may be undistinguishable from the first website. The system may block the subset of websites, and thereby prevent any user from accessing these fraudulent and malicious websites.

18 Claims, 5 Drawing Sheets

(56) References Cited

OTHER PUBLICATIONS

Beltzung et al., "Real-Time Detection of Fake-Shops through Machine Learning", IEEE, doi: 10.1109/BigData50022.2020.9378204, 2020, pp. 2254-2263. (Year: 2020).*

Mtetwa et al., "Feature selection for an SVM based webpage classifier", IEEE, doi: 10.1109/ISCMI.2017.8279603, 2017, pp. 85-88. (Year: 2017).*

* cited by examiner

| | |
|---|---|
| First URL | www.bassmutualbank.com — 302 |
| Similar URLs | www.bassmutaulbank.com — 304<br>www.bas_smutualbank.com — 306<br>www.bassmutual_sbank.com — 308<br>www.bas_zmutualbank.com — 310 |

IDENTIFYING AND BLOCKING FRAUDULENT WEBSITES

TECHNICAL FIELD

This application relates to systems and methods for identifying and blocking fraudulent and malicious websites.

BACKGROUND

Phishing is a process of inappropriately acquiring personal and sensitive information of a user. For instance, cyber attackers may generate websites directed towards commonly-misspelled domain addresses in hopes of capturing unsuspecting web users' personal and sensitive information. Accordingly, mistyping a website's uniform resource locator address may direct the user to these "fake" websites. Because these "fake" websites may have the same "look and feel" as the website intended to be visited by the user, the user may incorrectly input their personal and sensitive information. Successful phishing attacks may usually result in a user credential compromise or an installation of a remote access malware on a user computer, which may grant a backdoor access to the user computer.

Presently, the use of subtle mistakes in the uniform resource locators is increasingly being used in targeted phishing attacks where hackers are registering domains that appear similar to a legitimate domain of a company being targeted. Such phishing attacks are largely successful because users typically do not pay close attention to the spelling of the universal resource locators or websites that look trustworthy.

Conventional cyber security software solutions face technical shortcomings to efficiently and correctly identify and block fraudulent and malicious websites. One such traditional software solution is a security filter, which detects these malicious and fraudulent websites and provides a warning to the users. However, these security filters only rely on known fraudulent and malicious websites. Therefore, the security filters usually fail to identify and block unknown bad uniform resource locators associated with the fraudulent and malicious websites. Furthermore, conventional security filtering technique focus on websites having malware or other inappropriate content. However, the above-described phishing techniques may not use the websites that contain malware or other inappropriate content.

SUMMARY

What is therefore desired are systems and methods to identify and block unknown fraudulent uniform resource locators that are impersonating a popular brand uniform resource locator to target end users. In an example system described herein, a system generates many possible character mistakes in the popular brand uniform resource locator associated with a first website to produce a set of unique and similar uniform resource locators associated with a set of similar websites based on the popular brand uniform resource locator. The system executes machine vision algorithms to compare visual images of the first website with visual images of the set of similar websites to identify a subset of similar websites, which may be undistinguishable from the first website. The system then promptly blocks the subset of similar websites, thereby preventing the end users from accessing these fraudulent and malicious subset of similar websites.

In one embodiment, a server-implemented method may include receiving, by a server from an administrator computer, a first uniform resource locator corresponding to a first website having first visual attributes; executing, by the server, a permutation protocol to generate a set of similar uniform resource locators based on the first uniform resource locator; crawling, by the server, a set of websites where each website corresponds to each similar uniform resource locator of the set of similar uniform resource locators, wherein the server executes a screen scraping protocol to identify visual attributes associated with each of the set of websites; executing, by the server, a visual comparison protocol to identify a subset of websites from the set of websites such that each website within the subset of websites comprises the visual attributes that satisfy a similarity threshold with respect to the first visual attributes; transmitting, by the server to a webserver, an instruction to block each website within the subset of websites; and generating, by the server, a watch list comprising remaining websites of the set of websites, wherein the server periodically monitors content in each website within the watch list.

In another embodiment, a system may include a server configured to receive from an administrator computer, a first uniform resource locator corresponding to a first website having first visual attributes; execute a permutation protocol to generate a set of similar uniform resource locators based on the first uniform resource locator; crawl a set of websites where each website corresponds to each similar uniform resource locator of the set of similar uniform resource locators, wherein the server executes a screen scraping protocol to identify visual attributes associated with each of the set of websites; execute a visual comparison protocol to identify a subset of websites from the set of websites such that each website within the subset of websites comprises the visual attributes that satisfy a similarity threshold with respect to the first visual attributes; transmit to a webserver, an instruction to block each website within the subset of websites; and generate a watch list comprising remaining websites of the set of websites, wherein the server periodically monitors content in each website within the watch list.

It is to be understood that both the foregoing general description and the following detailed description are exemplary and explanatory and are intended to provide further explanation of the subject matter as claimed.

BRIEF DESCRIPTION OF THE DRAWINGS

The accompanying drawings constitute a part of this specification and illustrate embodiments that, together with the specification, explain the subject matter as claimed.

FIG. 3 shows a set of unique and similar uniform resource locators based on a first uniform resource locator, according to an embodiment.

DETAILED DESCRIPTION

Figure 1:
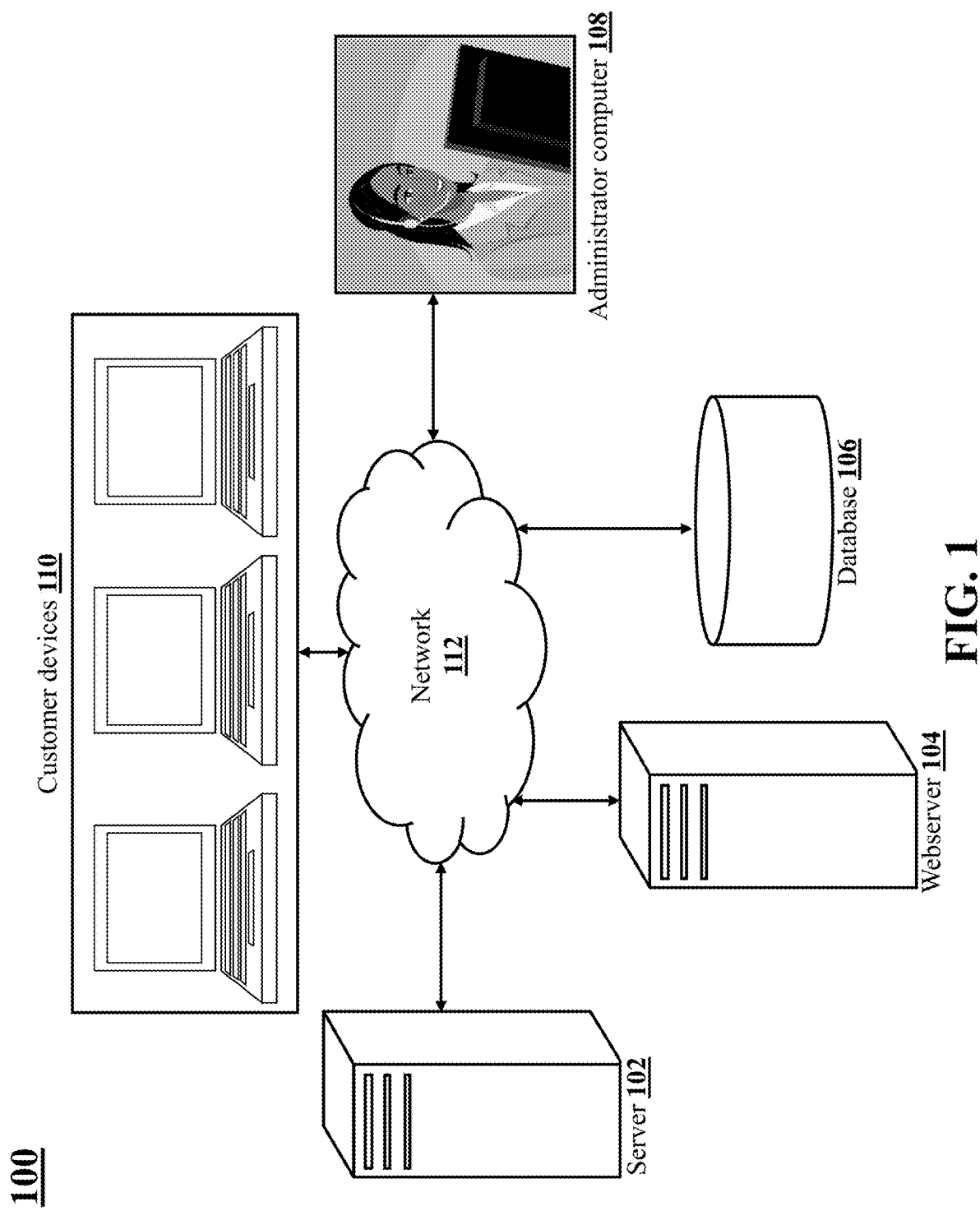
FIG. 1 shows various components of a system for identifying and blocking fraudulent and malicious websites at typosquatted domains, according to an embodiment.

The present disclosure is here described in detail with reference to embodiments illustrated in the drawings, which form a part here. Other embodiments may be used and/or other changes may be made without departing from the spirit or scope of the present disclosure. The illustrative embodiments described in the detailed description are not meant to be limiting of the subject matter presented here.

Reference will now be made to the illustrative embodiments illustrated in the drawings, and specific language will be used here to describe the same. It will nevertheless be understood that no limitation of the scope of the claims or this disclosure is thereby intended. Alterations and further modifications of the inventive features illustrated herein, and additional applications of the principles of the subject matter illustrated herein, which would occur to one skilled in the relevant art and having possession of this disclosure, are to be considered within the scope of the subject matter disclosed herein.

FIG. 1 shows various components of a system 100. The system 100 may include a server 102, a webserver 104, a database 106, an administrator computer 108, and customer devices 110. The server 102, the webserver 104, the database 106, the administrator computer 108, and the customer devices 110 may communicate with each other over a network 112. The network 112 may include, but is not limited to, private or public local area network, wireless local area network, metropolitan area network, wide-area network, and the Internet. The network 112 may further include both wired and wireless communications, according to one or more standards, via one or more transport mediums. The communication over the network 112 may be performed in accordance with various communication protocols, such as, transmission control protocol and internet protocol, user datagram protocol, and institute of electrical and electronics engineers communication protocols. The network 112 may further include wireless communications, according to Bluetooth specification sets, or another standard or proprietary wireless communication protocol.

The system 100 is described in a context of computer-executable instructions, such as program modules, being executed by server computers, such as the server 102. The server 102 may operate various software programs and algorithms, such as a typosquatting protocol. The typosquatting protocol may include a set of programs, objects, components, data structures, etc., which may perform particular tasks. The typosquatting protocol may further include multiple files, binaries, libraries, frameworks, interpreters, compilers, or other constructs, which may be used to execute associated protocols, such as a permutation protocol, a screen scraping protocol, and a visual comparison protocol. The server 102 may include one or more processors configured to execute the typosquatting protocol, which may be applied to automatically and periodically detect fraudulent and malicious websites from a set of websites, and subsequently implement blocking instructions to block such fraudulent and malicious websites. The features of the system 100 may be practiced either in a single computing device, or in a distributed computing environment, where various tasks may be performed by processing devices, which are linked through a network. In the distributed computing environment, the various program modules may be located in both local and remote computer storage media including memory storage devices.

An administrator computer 108 may be a computing and/or telecommunications device including a processor and capable of performing various tasks and processes described herein. Non-limiting examples of the administrator computer 108 may include a computer (e.g., desktop, laptop, server, tablet), or any other telecommunications or computing device used to communicate with the system 100. The administrator computer 108 may include a display screen and have network connectivity.

The administrator computer 108 may transmit credentials, such as administrator identification inputs to the webserver 104 from which the webserver 104 may authenticate the administrator. The administrator computer 108 may include a number of input devices (e.g., mouse, keyboard, touchscreen, stylus) configured to receive any number of data inputs, including various types of the administrator identification inputs allowing for authentication, e.g., username, passwords, certificates, biometrics.

The administrator computer 108 may directly interact with the server 102. The administrator computer 108 may interact with the server 102 via the webserver 104. The administrator computer 108 may execute an Internet browser or a local task application, which may access the webserver 104 in order to issue task requests to the server 102. In some embodiments, the administrator computer 108 may transmit a digital request application to the server 102, and the server 102 may process the digital request application. The digital request application may include the request to combat fraudulent and malicious websites. For instance, the request may be to combat typosquatting associated with a first uniform resource locator. The first uniform resource locator may correspond to a first website. The request may include visual images of webpages of the first website. The first website may be a legitimate website of a first company. The first website may have first visual attributes. The first visual attributes may include a shape of each item, a size of each item, a font of each item, a color of each item, and a position of each item on a first and other webpages of the first website. The items may include text, logos, pictures, etc. In response to the request, the administrator computer 108 may receive a list of blocked fraudulent and malicious websites and a watch list associated with the first uniform resource locator from the server 102.

A server 102 is a computing device. The server 102 may include a processing unit and a non-transitory machine-readable storage medium. The processing unit may include a processor with a computer-readable medium, such as a random access memory coupled to the processor. The server 102 may be executing algorithms or computer executable program instructions, which may be executed by a single processor or multiple processors in a distributed configuration. The server 102 may interact with one or more software modules of a same or a different type operating within the system 100.

Non-limiting examples of the processor may include a microprocessor, an application specific integrated circuit, and a field programmable object array, among others. The server 102 may be capable of executing various tasks. Non-limiting examples of the server 102 may include a desktop computer, a server computer, a laptop computer, a tablet computer, and the like. For ease of explanation, the FIG. 1 shows a single server computing device functioning as the server 102. However, some embodiments may include a plurality of server computing devices capable of performing the various tasks described herein.

The server 102 may receive the request from the administrator computer 108 where the request may include information associated with the first uniform resource locator. The server 102 may receive the request from the administrator computer 108 in a form of a document file specifying the information associated with the first uniform resource locator. The document file may include multiple fields providing information related to an administrator name, contact information of the administrator, and the information associated with the first uniform resource locator.

The server 102 upon receiving the document file may process the document file. The server 102 may determine whether the document file is already pre-cropped and binarized. The server 102 upon determining that the document file is not pre-cropped and binarized, the server 102 may pre-process the document file to frame, crop, binarize and clean up the document file for standard correction. The preprocessing may include a preliminary data capture of, e.g., the information associated with the first uniform resource locator in the document file. The information associated with the first uniform resource locator may include the visual images of the first website, which may contain the first visual attributes associated with the first website. The information associated with the first uniform resource locator may only include the first visual attributes associated with the first website. The first visual attributes may include the shape of each item, the size of each item, the font of each item, the color of each item, and the position of each item on one or more webpages of the first website.

The server 102 may periodically execute the typosquatting protocol using the information within the request as an input. The execution of the typosquatting protocol may trigger the execution of the associated permutation protocol to generate a set of similar uniform resource locators based on the first uniform resource locator. The permutation protocol may be a computer program comprising commands based on one or more permutation rules. The one or more permutation rules may at least include a first permutation rule, a second permutation rule, a third permutation rule, and a fourth permutation rule.

The first permutation rule may correspond to swapping positions of any two adjacent characters in the first uniform resource locator to generate an identical and linguistically-similar uniform resource locator having swapped positons of the two adjacent characters of the first uniform resource locator. The second permutation rule may correspond to an elimination of one character from any two same characters, which are positioned adjacent to each other in the first uniform resource locator to generate the identical and linguistically-similar uniform resource locator. The third permutation rule may correspond to an addition of one predetermined character (for example, "s") at an end position of the first uniform resource locator to generate the identical and linguistically-similar uniform resource locator. The fourth permutation rule may correspond to a replacement of at least one character (for example, "s") in the first uniform resource locator with a corresponding pre-defined substitute character (for example, "z") to generate the identical and linguistically-similar uniform resource locator.

The server 102 may iteratively modify the first uniform resource locator to replace one or more characters in the first uniform resource locator with one or more pre-defined substitute characters based on the one or more permutation rules, in response to execution of the permutation protocol. Accordingly, the server 102 may generate a set of similar uniform resource locators based on the first uniform resource locator. Each similar uniform resource locator may be identical and linguistically-similar to the first uniform resource locator but with intentional typographical errors. Each similar uniform resource locator may direct to an alternative website or a fake version of the first website, which may be usually designed for malicious purposes.

The server 102 may periodically access a set of websites associated with the set of similar uniform resource locators. The server 102 may crawl the set of websites associated with the set of similar uniform resource locators. The server 102 may execute the screen scraping protocol, which may be associated with the typosquatting protocol. The screen scraping protocol may be a computer program comprising commands based on one or more screen scraping rules. The screen scraping rules may be associated with programmatic collection of visual data and images from a source site. In response to the execution of the screen scraping protocol, the server 102 may perform screen scraping and extract visual and other image data from each of the set of websites. The content of a first and other webpages of each of the set of websites may be parsed, searched, reformatted, its data, such as visual images and visual attributes of the first and other webpages copied into the database 106. The visual attributes may include a shape of each item, a size of each item, a font of each item, a color of each item, and a position of each item on each webpage of each of the set of websites.

The server 102 may execute the visual comparison protocol, which may be associated with the typosquatting protocol. The visual comparison protocol may be a computer program comprising commands based on one or more computer vision rules. The computer vision rules may be associated with a field of artificial intelligence to interpret and understand visual attributes of various websites, and thereby accurately identify, classify, and compare items within the various websites. In response to the execution of the visual comparison protocol, the server 102 may compare the first visual attributes within the visual images associated with the first website with the visual attributes within the visual images associated with each of the set of websites. Based on the comparison, the server 102 may identify a subset of websites from the set of websites, which may include one or more visual attributes, which may match with corresponding one or more first visual attributes associated with the first website. The one or more first visual attributes may at least include a name and a logo of the first company.

The server 102 may include image processing algorithms, which may be associated with the visual comparison protocol. The image processing algorithms may be stored in memories of the server 102 or other devices of the system 100 for pre-processing and processing the visual images of the webpages of the first website and each of the set of websites. The image processing algorithms may perform compression, correction, noise reduction, color corrections, geometric corrections, imager non-uniformity correction, etc., and various image processing enhancement operations on the visual images of the webpages of the first website and each of the set of websites.

The server 102 may implement the image processing algorithms as a plurality of software objects residing in its memory or other devices of the system 100. The image processing algorithms may be numerical and symbolic algorithms for the manipulation of the visual images of the webpages of the first website and the each of the set of websites. The image processing algorithms may be a mixture of custom developed algorithms and libraries. The image processing algorithms may further be arranged in any logical sequence, with potential changes in the sequence of processing or parameters governing the processing determined by image type, computational requirements or outputs from other algorithms.

The server 102 may execute machine vision algorithms, which may be associated with the image processing algorithms to perform, among other operations, digit recognition, printed and handwritten text recognition, symbol, logo and watermark recognition, and general shape recognition in processed visual images of the webpages of the first website and each of the set of websites. The server 102 may use machine learning techniques to train the machine vision algorithms to discriminate between features (for example, visual attributes) and to identify similarity between the visual images of the webpages of the first website and each of the set of websites. The machine learning techniques may be stored in the memories of the server 102 or other devices of the system 100. The machine vision algorithms may be trained to identify the items belonging to a specific group by providing the machine vision algorithms with many training examples of the items belonging to the specific group. The machine vision algorithms may be supplied with pre-made database with which to compare any new item that is later presented to the machine vision algorithms during use.

The machine vision algorithms, which may be applied to determine the similarity between the visual images of the webpages of the first website and each of the set of websites, may further include computer vision applications, such as image analysis applications that may use a feature detector or a combination of detectors. For example, a texture detector, a color detector, and an edge detector may be used. If specific texture, specific color, and specific edges may be detected in a set of visual images of the webpages of the first website and a subset of websites from the set of websites, then a positive similarity determination may be made. Accordingly, the server 102 may identify the subset of websites from the set of websites having one or more visual images, which may match with corresponding one or more visual images of the first website.

The server 102 may generate a record of the subset of websites. The record may include a subset of similar uniform resource locators associated with the subset of websites. The record may include a web link to each of the subset of websites. The record may include information associated with matching visual attributes in each of the subset of websites. The server 102 may transmit an alert to the administrator computer 108, in response to the request. The alert may include an electronic message, which may include the record of the subset of websites. The administrator computer 108 may review the record, and authorize the blocking of the subset of websites.

The server 102 may generate and transmit one or more blocking instructions to the webserver 104, which may manage various websites to block each website within the subset of websites. On receiving the blocking instructions, the webserver 104 may communicate a blocking command to block operation of each of the subset of websites with a computer of an institution, e.g., a web hosting company that is responsible for coordinating maintenance and operation of the subset of websites. The computer of the institution may receive and process the blocking command by blocking operation of each of the subset of websites.

The server 102 may invoke a function or a routine in a first company software application running on the customer devices 110 operated by customers of the first company to block and disable access to unwanted websites, such as the subset of websites. When the first company software application is invoked and activated on the customer devices 110, an executable host file stored locally on the customer devices 110 may automatically add the subset of websites to its restrictions list. This may prevent the customers of the first company to access the subset of websites on their customer devices 110.

The server 102 may generate the watch list, which may include remaining websites of the set of websites apart from the subset of websites. The server 102 may store the watch list in the database 106. The server 102 may periodically (for example, every week) monitor and parse content of each webpage in each website within the watch list. The server 102 may periodically execute the visual comparison protocol to compare the first visual attributes associated with the first website with visual attributes associated with each website within the watch list. The server 102 may identify a new subset of websites from the watch list, which may include one or more visual attributes, which may match with the one or more first visual attributes of the first website. The server may transmit a new alert to the administrator computer 108, which may include a record of the new subset of websites. The server 102 may instruct the webserver 104 to block each website within the new subset of websites. The server 102 may invoke the first company software application on the customer devices 110 to disable access to the new subset of websites. The executable host file on the customer devices 110 may add the new subset of websites to its restrictions list. This may prevent the customers of the first company to access the subset of websites on their customer devices 110.

A webserver 104 is a computing device. The webserver 104 may include a processing unit and a non-transitory machine-readable storage medium. The processing unit may include a processor with a computer-readable medium, such as a random access memory coupled to the processor. The webserver 104 may be executing algorithms or computer executable program instructions, which may be executed by a single processor or multiple processors in a distributed configuration. The webserver 104 may be configured to interact with one or more software modules of a same or a different type operating within the system 100.

Non-limiting examples of the processor may include a microprocessor, an application specific integrated circuit, and a field programmable object array, among others. The webserver 104 is capable of executing various tasks. Non-limiting examples of the webserver 104 may include a desktop computer, a server computer, a laptop computer, a tablet computer, and the like. While the system 100 may include a single webserver 104, however, in some embodiments the webserver 104 may include any number of computing devices operating in a distributed computing environment.

The webserver 104 may execute software applications configured to host a website (e.g., the task application) on the administrator computer 108. The webserver 104 may generate and serve various pages associated with the task application on the administrator computer 108 upon authentication of an administrator operating the administrator computer 108. The webserver 104 may be configured to require administrator authentication based upon a set of administrator credentials (e.g., username, password, biometrics, cryptographic certificate). The webserver 104 may access the database 106 configured to store administrator credentials, which the webserver 104 may be configured to reference in order to determine whether a set of entered administrator credentials purportedly authenticating the administrator match an appropriate set of administrator credentials that identify and authenticate the administrator. Similarly, in some implementations, the webserver 104 may generate and serve the pages associated with the task application on the administrator computer 108 based upon an administrator profile within the system 100. The administrator profile may be defined by information fields in administrator records stored in the database 106, and authentication of the administrator may be conducted by the webserver 104 by executing an access directory protocol. The webserver 104 may be instructed to generate task application content according to the administrator profile defined in the administrator record in the database 106.

The webserver 104 may execute software applications configured to host a mobile application (e.g., the first company software application) on the customer devices 110 operated by the customers of the first company. The webserver 104 may invoke the function or the routine in the first company software application running on the customer devices 110 to block and disable access to the subset of websites on receiving the blocking instructions from the server 102. The webserver 104 may generate and present a notification on a display screen of the customer devices 110, which may indicate that the subset of websites are a fake version of the first website. When the first company software application is invoked and activated on the customer devices 110, an executable host file stored locally on the customer devices 110 may add the subset of websites to its restrictions list. This may prevent the customers of the first company to access the subset of websites on their customer devices 110.

Customer devices 110 may be computing devices, which may include a processing unit. The processing unit may include a processor with a computer-readable medium, such as a random access memory coupled to the processor. The customer devices 110 may be running algorithms or computer executable program instructions, which may be executed by a single processor or multiple processors in a distributed configuration. The customer devices 110 may interact with one or more software modules of a same or a different type operating within the system 100.

Non-limiting examples of the processor may include a microprocessor, an application specific integrated circuit, and a field programmable object array, among others. Non-limiting examples of the customer devices 110 may include the mobile phone (e.g., a smartphone, PDA) and the personal computer (e.g., a tablet device). The customer devices 110 may be operated by the customers. The customer may refer to an individual who is working for the first company or is availing services from the first company.

The customer devices 110 may include a client-side first company software application from which the customers may access products and services of the first company. The first company software application may be a software stack running on an operating system of the customer devices 110. The first company software application may have a protocol layer and a user interface layer where each layer may be responsible for specific functions. The protocol layer of the first company software application may communicate with the operating system of each customer device 110 and may manage the connections of each customer device 110 over the network 112. The protocol layer may communicate with the user interface layer. The protocol layer may be arranged to control the user interface layer, and to present information (for example, notifications) to the customer via a user interface of the first company software application and to receive information from the customer via the user interface of the first company software application. The notifications may be received from the webserver 104 and may include information associated with the subset of websites, which may be the fake version of the first website and are being blocked.

A database 106 may communicate with the server 102 and the webserver 104. The database 106 may be in communication with a processor of the server 102 and the webserver 104 where the processor is capable of executing the various commands of the system 100. The database 106 may be part of the server 102 and the webserver 104. The database 106 may be a separate component in communication with the server 102 and the webserver 104. The database 106 may be capable of storing information, such as the watch list in a plain format and an encrypted version. The database 106 may store data records associated with various aspects of software application services offered to the administrator and the customers. Non-limiting examples of what may be stored in the database 106 may include administrator records that may include data fields describing administrators, e.g., administrator data, such as administrator credentials (e.g., username, passwords, biometrics, encryption certificates), administrator profile, administrator account data, or administrator permissions; document records that may comprise machine-readable computer files (e.g., word processing files), parsed portions of such computer files, or metadata associated with computer files; and application data that may include software instructions or data used by various software algorithms.

Figure 2:
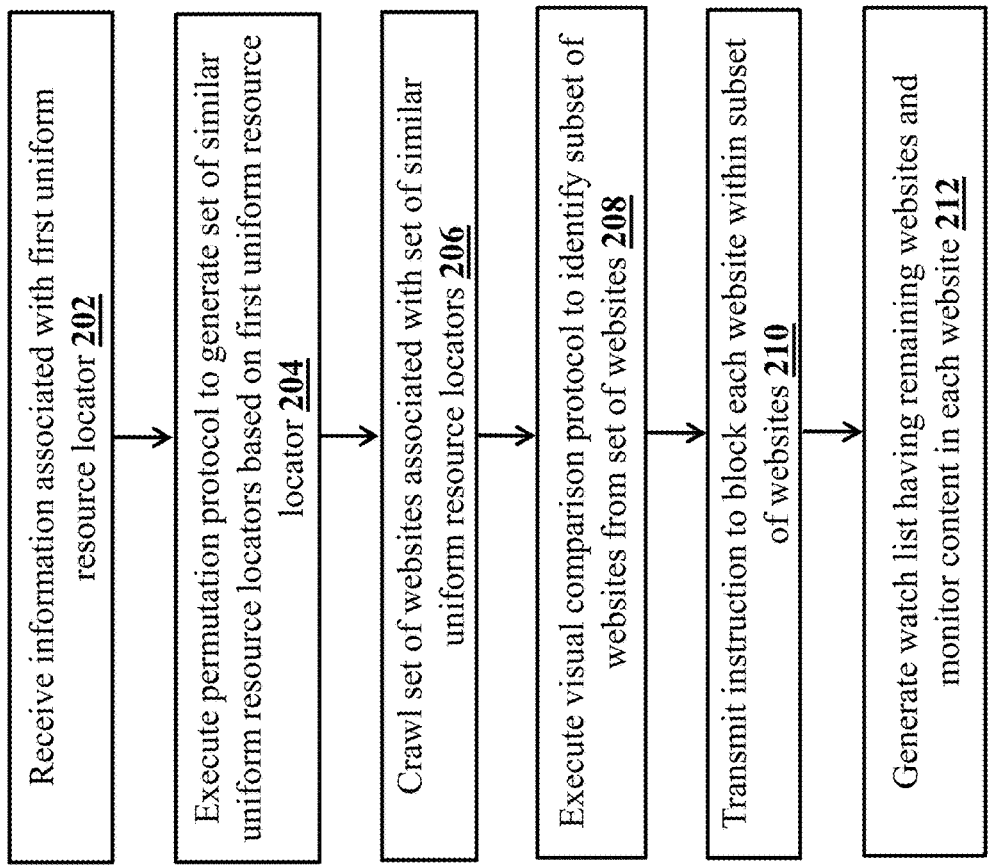
FIG. 2 shows a method for identifying and blocking fraudulent and malicious websites at typosquatted domains, according to an embodiment.

FIG. 2 shows execution steps for identifying and blocking fraudulent and malicious websites at typosquatted domains, according to a method 200. The method 200 shown in the FIG. 2 includes execution steps 202, 204, 206, 208, 210, and 212. However, it should be appreciated that other embodiments may include additional or alternative execution steps, or may omit one or more steps altogether. It should also be appreciated that other embodiments may perform certain execution steps in a different order; steps may also be performed simultaneously or near-simultaneously with one another. In addition, the method 200 of the FIG. 2 is described as being executed by a single server in this embodiment. However, in some embodiments, steps may be executed by multiple servers operating in a distributed computing environment.

In a first step 202, the server may receive a request from an administrator computer. The request may include information associated with a first uniform resource locator. The information associated with the first uniform resource locator may include one or more visual images of one or more webpages of a first website, which may be associated with the first uniform resource locator.

Figure 4A:
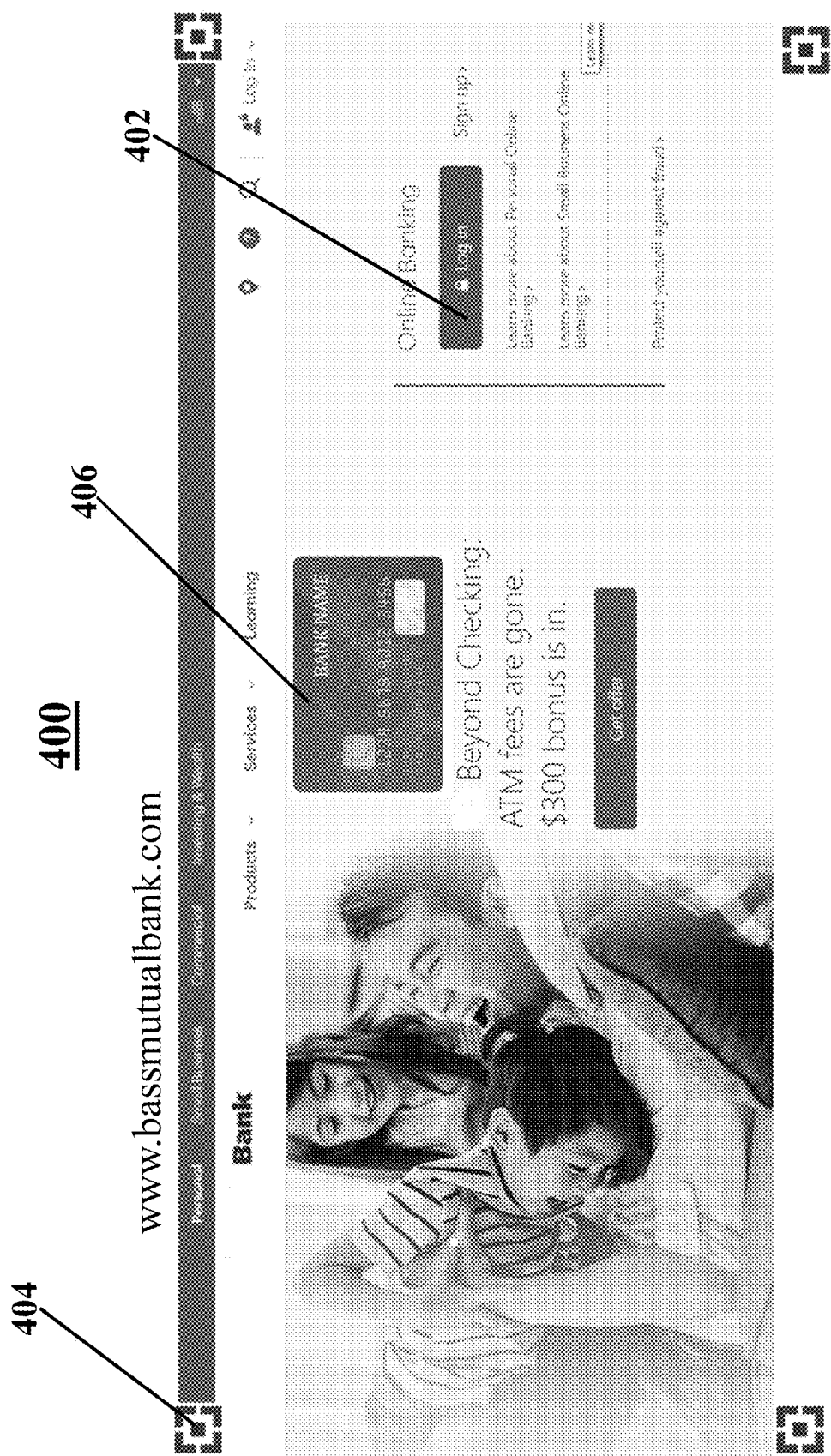
FIG. 4A shows a first webpage of a first website associated with a first uniform resource locator, according to an embodiment.

In one non-limiting example, the first uniform resource locator may be www.bassmutualbank.com 302, as shown in the FIG. 3. The first website associated with the www-.bassmutualbank.com 302 has a first webpage (for example, a home page) 400, as shown in the FIG. 4A.

The first website may include one or more graphical components (for example items, such as text 402, logo 404 and picture 406) on its first webpage 400. The first webpage 400 may have a set of first visual attributes. The first visual attributes may include a shape of each graphical or textual component (for example, square shape of the logo 404), a size of each graphical or textual component (for example, the size of the logo 404 is 2 units and the size of the picture 406 is 10 units), a font of each graphical or textual component (for example, the font of the text 402 is italics), a color of each graphical or textual component (for example, the color of each item is green), and a position of each graphical or textual component (for example, the logo 404 is placed on each edge and the picture 406 is placed around the center position) on the first webpage 400. The first visual attributes may further include image quality, resolution, blur, image segmentation characteristics, occlusions, etc. of the first webpage 400.

In a next step 204, the server may execute a permutation protocol to generate a set of similar uniform resource locators based on the first uniform resource locator. The permutation protocol may be a computer program comprising commands based on one or more permutation rules. In response to execution of the permutation protocol, the server may iteratively identify and change one or more characters in the first uniform resource locator based on the one or more permutation rules. The one or more permutation rules may at least include a first permutation rule, a second permutation rule, a third permutation rule, and a fourth permutation rule. These permutation rules are described below.

The first permutation rule may include instructions to swap positions of any two adjacent characters in the first uniform resource locator, and generate one of the set of similar uniform resource locators having swapped positons of the two adjacent characters. In one non-limiting example, the server may swap two adjacent characters "a" and "u" in the first uniform resource locator, such as www.bassmutualbank.com 302 to generate a first similar uniform resource locator, such as www.bassmutulbank.com 304 as shown in the FIG. 3.

The second permutation rule may include instructions to eliminate one character from any two same characters, which are positioned adjacent to each other in the first uniform resource locator to generate one of the set of similar uniform resource locators. In one non-limiting example, the two adjacent same characters may correspond to "s" in the first uniform resource locator, such as www.bassmutualbank.com 302 and the server may remove one of the "s" from the first uniform resource locator to generate a second similar uniform resource locator, such as www.basmutualbank.com 306 as shown in the FIG. 3.

The third permutation rule may include instructions to add one predetermined character (for example, "s") at an end position of the first uniform resource locator to generate one of the set of similar uniform resource locators. In one non-limiting example, the server may add a predetermined character "s" at the end of the first uniform resource locator, such as www.bassmutualbank.com 302 to generate a third similar uniform resource locator, such as www.bassmutualsbank.com 308 as shown in the FIG. 3.

The fourth permutation rule may include instructions to a replace at least one character (for example, "s") from the first uniform resource locator with a corresponding pre-defined substitute character (for example, "z") to generate one of the set of similar uniform resource locators. In one non-limiting example, the server may replace one predetermined character "s" in the first uniform resource locator, such as www.bassmutualbank.com 302 with the corresponding pre-defined substitute character (for example, "z") to generate a fourth similar uniform resource locator, such as www.baszmutualbank.com 310 as shown in the FIG. 3.

As discussed above, the set of similar uniform resource locators may include the first similar uniform resource locator, the second similar uniform resource locator, the third similar uniform resource locator, and the fourth similar uniform resource locator. The set of similar uniform resource locators may correspond to a set of websites, which may be malicious. For instance, the first similar uniform resource locator may correspond to a first similar website. The first similar website may be www.bassmutaulbank.com 304.

In a next step 206, the server may crawl the set of websites to identify different webpages in each of the set of web sites. The server may capture visual images of each webpage of the set of websites using a screen scraping protocol, which may be associated with a camera device. The server may store the visual images of each webpage of the set of websites in the database.

The server may pre-process the visual images of each webpage of the set of websites to generate pre-processed visual images. The visual images of each webpage of the set of websites may be normalized with respect to size and orientation. For example, if properties of the visual images of each webpage of the set of websites may vary from preferred properties, the visual images of each webpage of the set of websites may be transformed to have those properties. As a further example, the actual resolution of the visual images of each webpage of the set of websites may be different than indicated in their respective file properties. In such a case, the visual images of each webpage of the set of websites may be processed to indicate their correct resolutions.

The server may process the pre-processed visual images to determine visual attributes. Each visual image of each webpage (for example, the home page) of the set of websites (for example, the first similar website) may include items, such as the text, the logo, and the picture. The visual attributes may include a shape of each item, a size of each item, a font of each item, a color of each item, and a position of each item on the webpages of each website. The visual attributes may further include image quality, resolution, blur, image segmentation characteristics, occlusions, etc. of the each webpage of each website.

Figure 4B:
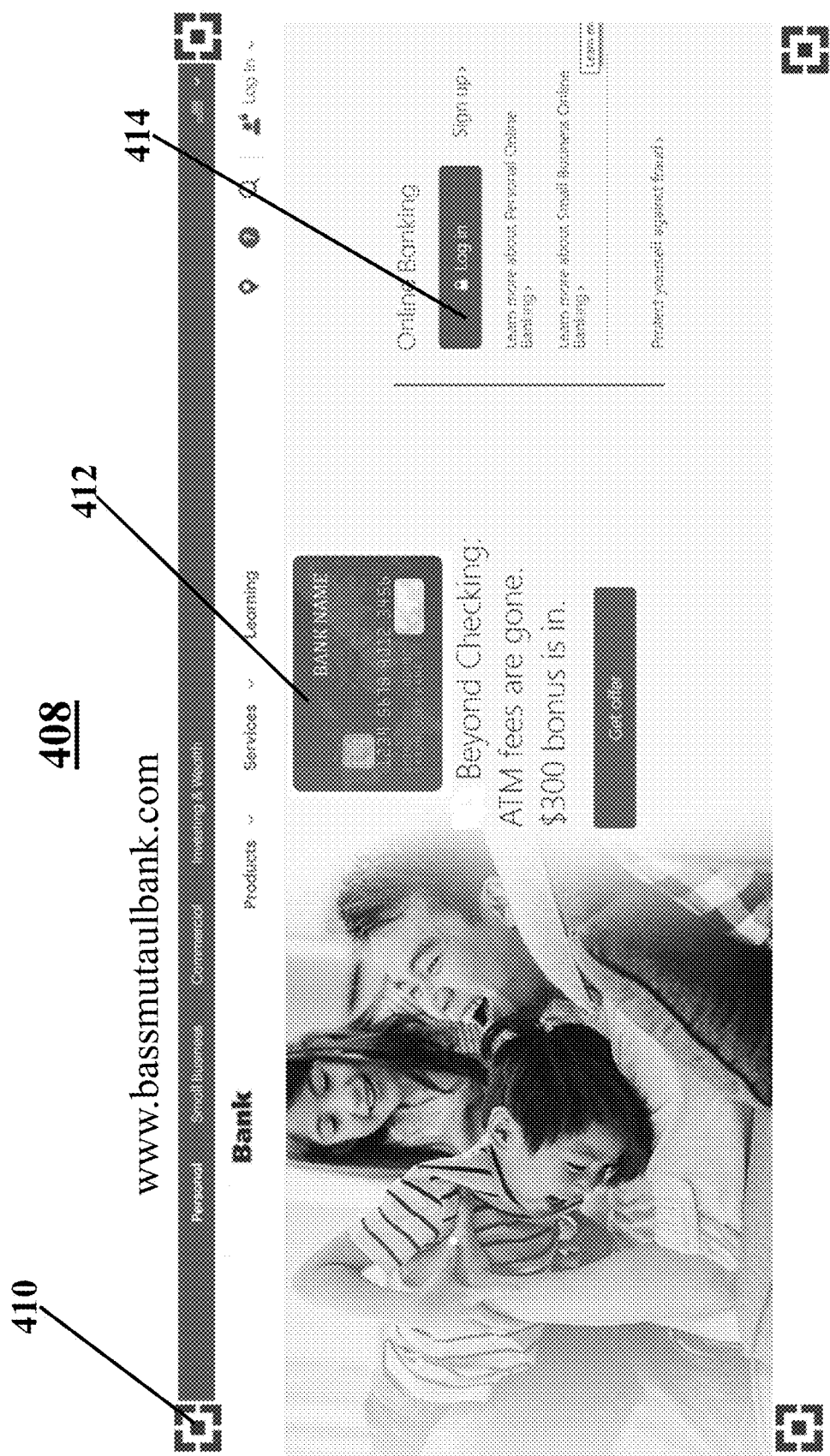
FIG. 4B shows a first webpage of a first similar website from a set of unique and similar uniform resource locators, according to an embodiment.

In one non-limiting example, the first similar website, such as, www.bassmutaulbank.com 304, may have a first webpage (for example, the home page) 408, as shown in the FIG. 4B. The first similar website may include one or more graphical components (for example, text 414, logo 410 and picture 412) resembling the visual attributes of the first webpage 400 of the first similar website. The visual attributes may include a shape of each graphical or textual component, a size of each graphical or textual component, a font of each graphical or textual component, a color of each graphical or textual component, and a position of each graphical or textual component on the first webpage 408 of the first similar website.

In a next step 208, the server may execute a visual comparison protocol to compare the first website with the set of websites. The first website may include at least the first webpage, which may be associated with one or more first visual attributes. The one or more first visual attributes may be determined from the visual images of the first webpage of the first website. Each of the set of websites may include at least the first webpage. The first webpage of each of the set of websites may be associated with one or more visual attributes. The one or more visual attributes may be determined from the visual images of the first webpage of each of the set of web sites.

In response to the execution of the visual comparison protocol, the server may process and compare the visual images of first webpage of the first website and the set of websites with each other. The server may determine if the one or more first visual attributes associated with the first webpage of the first website may match the one or more visual attributes associated with the first webpage of each of the set of websites. The server may iteratively compare each first visual attribute associated with the first webpage of the first website with each visual attribute associated with the first webpage of each of the set of websites until all the attributes are compared with each other.

The server may identify a subset of websites from the set of websites such that each website within the subset of websites may include the visual attributes, which may satisfy a similarity threshold with respect to the first visual attributes. The similarity threshold may be satisfied when at least one visual attribute associated with the first webpage of the set of websites is same as a corresponding first visual attribute associated with the first webpage of the first website. In one non-limiting example, when the server may determine that the one or more visual attributes of the first similar website may match with the one or more first visual attributes of the first website, the server may include the first similar website, such as, www.bassmutaulbank.com 304 in the subset of websites.

In a next step 210, the server may generate a first alert upon identification of the subset of websites. The server may transmit the first alert to the administrator computer. The first alert may include a notification, which may indicate that each website of the subset of websites is a malicious and a fake website whose look and feel are almost identical to the first website.

The administrator computer may review content of each of the subset of websites. The administrator computer may generate a blocking instruction. The administrator computer may directly transmit the blocking instruction to a webserver. In another embodiment, the administrator computer may transmit the blocking instruction to the server, and the server may transmit the blocking instruction to the webserver. In yet another embodiment, the server may generate and transmit the blocking instruction to the webserver. The blocking instruction may include commands to block each website within the subset of websites.

The webserver may receive and execute the blocking instruction. The webserver may directly block each website within the subset of websites. The webserver may transmit the blocking instruction to a computer of a web hosting company, which may block each website within the subset of websites. The server may monitor blocking operation of each website within the subset of websites. When each website within the subset of websites is successfully blocked, the server may transmit an electronic message to the administrator computer, which may indicate that the blocking operation is completed.

In a next step 212, the server may generate a watch list. The server may store the watch list in the database. The watch list may include remaining websites of the set of websites after the elimination of the subset of websites from the set of websites. The server may periodically monitor content in each website within the watch list. The server may generate a second alert when the content in any website within the watch list is updated. The server may transmit the second alert to the administrator computer. The second alert may include a notification, which may indicate a name of the website within the watch list whose content is updated, a date and a time of update, etc.

The server may execute the visual comparison protocol to identify a second subset of websites from the remaining websites within the watch list whose content has been updated such that each website within the second subset of websites may include the visual attributes, which may satisfy the similarity threshold with respect to the first visual attributes of the first website. The server may generate and transmit a new blocking instruction to the webserver. The new blocking instruction may include commands to block each website within the second subset of websites. When each website within the second subset of websites is successfully blocked, the server may transmit the electronic message to the administrator computer, which may indicate that the blocking operation is completed.

Non-Limiting Example

A company may have a first web address associated with their first website. A server of the company may generate a set of web addresses, which may be linguistically-similar to the first web address. The server may determine whether the set of web addresses direct to any websites. If they do, the server may capture visual images of webpages of these websites. The server may compare these captured visual images with visual images of webpages of the first website. Based on the comparison, the server may identify a subset of websites, which may be very similar to the first website. The server may block a subset of web addresses, which may be associated with the subset of websites.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present subject matter.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the subject matter. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module, which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present subject matter. Various modifications to these embodiments will be readily apparent to those skilled in the art, and the generic principles defined herein may be applied to other embodiments without departing from the spirit or scope of the subject matter. Thus, the present subject matter is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

What is claimed is:

1. A server-implemented method comprising: receiving, by a server from an administrator computer, a first uniform resource locator corresponding to a first website having first visual attributes; executing, by the server, a permutation protocol to generate a set of similar uniform resource locators based on the first uniform resource locator; crawling, by the server, a set of websites where each website corresponds to each similar uniform resource locator of the set of similar uniform resource locators, wherein the server executes a screen scraping protocol to identify visual attributes associated with each of the set of websites; comparing, by the server, each visual attribute with the first visual attributes to identify a subset of websites from the set of websites such that each website within the subset of websites comprises the visual attributes that satisfy a similarity threshold with respect to the first visual attributes, wherein the visual attributes of each website comprises one or more of a shape of each item, a size of each item, a font of each item, a color of each item, or a position of each item on a webpage of each website; comparing transmitting, by the server to a webserver, an instruction to block each website within the subset of websites; and generating, by the server, a watch list comprising remaining websites of the set of websites, wherein the server periodically monitors content in each website within the watch list.

2. The server-implemented method according to claim 1, further comprising: generating, by the server, a first alert upon identification of the subset of websites, wherein the first alert is transmitted to the administrator computer.

3. The server-implemented method according to claim 1, further comprising: generating, by the server, a second alert when the content in any website within the watch list is changed, wherein the second alert is transmitted to the administrator computer.

4. The server-implemented method according to claim 1, further comprising: executing, by the server, the visual comparison protocol to identify a second subset of websites from the remaining websites within the watch list such that each website within the second subset of websites comprises the visual attributes that satisfy the similarity threshold with respect to the first visual attributes.

5. The server-implemented method according to claim 1, wherein the server is configured to: execute the permutation protocol after predetermined time intervals to generate the set of similar uniform resource locators based on the first uniform resource locator.

6. The server-implemented method according to claim 1, wherein the first visual attributes comprises a shape of each item, a size of each item, a font of each item, a color of each item, and a position of each item on a first webpage of the first website.

7. The server-implemented method according to claim 1, wherein the similarity threshold is satisfied when at least one of the visual attributes is same as corresponding visual attribute within the first visual attributes.

8. The server-implemented method according to claim 1, wherein the permutation protocol is associated with one or more permutation rules.

9. The server-implemented method according to claim 8, wherein the one or more permutation rules correspond to replacement of a character from the first uniform resource locator with a corresponding pre-defined substitute character to generate one of the set of similar uniform resource locators.

10. A system comprising: a server configured to: receive from an administrator computer, a first uniform resource locator corresponding to a first website having first visual attributes; execute a permutation protocol to generate a set of similar uniform resource locators based on the first uniform resource locator; crawl a set of websites where each website corresponds to each similar uniform resource locator of the set of similar uniform resource locators, wherein the server executes a screen scraping protocol to identify visual attributes associated with each of the set of websites; compare, by the server, each visual attribute with the first visual attributes to identify a subset of websites from the set of websites such that each website within the subset of websites comprises the visual attributes that satisfy a similarity threshold with respect to the first visual attributes, wherein the visual attributes of each website comprises one or more of a shape of each item, a size of each item, a font of each item, a color of each item, or a position of each item on a webpage of each website; transmit to a webserver, an instruction to block each website within the subset of websites; and generate a watch list comprising remaining websites of the set of websites, wherein the server periodically monitors content in each website within the watch list.

11. The system comprising according to claim 10, wherein the server is further configured to: generate a first alert upon identification of the subset of websites, wherein the first alert is transmitted to the administrator computer.

12. The system comprising according to claim 10, wherein the server is further configured to: generate a second alert when the content in any website within the watch list is changed, wherein the second alert is transmitted to the administrator computer.

13. The system comprising according to claim 10, wherein the server is further configured to: execute the visual comparison protocol to identify a second subset of websites from the remaining websites within the watch list such that each website within the second subset of websites comprises the visual attributes that satisfy the similarity threshold with respect to the first visual attributes.

14. The system comprising according to claim 10, wherein the server is configured to: execute the permutation protocol after predetermined time intervals to generate the set of similar uniform resource locators based on the first uniform resource locator.

15. The system comprising according to claim 10, wherein the first visual attributes comprises a shape of each item, a size of each item, a font of each item, a color of each item, and a position of each item on a first webpage of the first website.

16. The system comprising according to claim 10, wherein the similarity threshold is satisfied when at least one of the visual attributes is same as corresponding visual attribute within the first visual attributes.

17. The system comprising according to claim 10, wherein the permutation protocol is associated with one or more permutation rules.

18. The system comprising according to claim 17, wherein the one or more permutation rules correspond to replacement of a character from the first uniform resource locator with a corresponding pre-defined substitute character to generate one of the set of similar uniform resource locators.

* * * * *